US012049129B2

(12) United States Patent
Tatsuwaki et al.

(10) Patent No.: US 12,049,129 B2
(45) Date of Patent: Jul. 30, 2024

(54) VEHICLE BODY LOWER STRUCTURE

(71) Applicant: Honda Motor Co., Ltd., Tokyo (JP)

(72) Inventors: Masaaki Tatsuwaki, Saitama (JP); Ken Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 344 days.

(21) Appl. No.: 17/513,808

(22) Filed: Oct. 28, 2021

(65) Prior Publication Data

US 2022/0153112 A1    May 19, 2022

(30) Foreign Application Priority Data

Nov. 19, 2020   (JP) .................................. 2020-192780

(51) Int. Cl.
*B60K 1/04*       (2019.01)
*H01M 50/162*     (2021.01)
*H01M 50/172*     (2021.01)
*H01M 50/188*     (2021.01)

(52) U.S. Cl.
CPC ............. *B60K 1/04* (2013.01); *H01M 50/162* (2021.01); *H01M 50/172* (2021.01); *H01M 50/188* (2021.01); *B60K 2001/0438* (2013.01)

(58) Field of Classification Search
CPC ............. B60K 1/04; B60K 2001/0438; H01M 50/162; H01M 50/172; H01M 50/188
See application file for complete search history.

(56) References Cited

U.S. PATENT DOCUMENTS

| 8,993,142 | B2 | 3/2015 | Sakai et al. | |
| 9,160,042 | B2 * | 10/2015 | Fujii | H01M 10/625 |
| 10,967,722 | B2 * | 4/2021 | Tanaka | B60L 50/64 |
| 11,211,647 | B2 | 12/2021 | Itai | |
| 11,458,829 | B2 | 10/2022 | Ohkuma et al. | |
| 11,827,089 | B2 * | 11/2023 | Tatsuwaki | H01M 50/298 |
| 2009/0186266 | A1 * | 7/2009 | Nishino | B60L 50/66 |
| | | | | 429/120 |
| 2009/0197154 | A1 * | 8/2009 | Takasaki | H01M 10/625 |
| | | | | 429/83 |
| 2013/0026786 | A1 * | 1/2013 | Saeki | B60K 1/04 |
| | | | | 296/187.08 |

(Continued)

FOREIGN PATENT DOCUMENTS

| CN | 103545467 | 1/2014 |
| CN | 111422051 | 7/2020 |

(Continued)

OTHER PUBLICATIONS

Office Action of Japan Counterpart Application, with English translation thereof, issued on Jun. 20, 2023, pp. 1-7.

(Continued)

*Primary Examiner* — Jeffrey J Restifo

(74) *Attorney, Agent, or Firm* — JCIPRNET

(57) ABSTRACT

Provided is a vehicle body lower structure. A vehicle body lower structure includes a battery pack that encloses a drive battery. The battery pack includes a tray and a cover member attached to an upper surface of the tray with a seal member interposed, the seal member making the inside of the battery pack liquid-tight. A battery terminal, a high-voltage junction box, a control device, and a switch, which are connection portions of an electric cable, are arranged above the seal member.

21 Claims, 14 Drawing Sheets

(56) References Cited

U.S. PATENT DOCUMENTS

| | | | | |
|---|---|---|---|---|
| 2013/0298586 | A1* | 11/2013 | Hwang | B60L 3/0046 429/61 |
| 2014/0017538 | A1* | 1/2014 | Nakamori | H01M 50/271 429/99 |
| 2014/0017546 | A1* | 1/2014 | Yanagi | H01M 10/613 429/120 |
| 2014/0338999 | A1* | 11/2014 | Fujii | B60L 58/26 180/68.5 |
| 2017/0040836 | A1* | 2/2017 | Ozaki | B60L 53/12 |
| 2018/0312199 | A1* | 11/2018 | Kawase | B60K 1/04 |
| 2018/0312200 | A1* | 11/2018 | Kawase | B62D 21/157 |
| 2018/0345817 | A1* | 12/2018 | Yamamoto | H01M 10/6568 |
| 2019/0210659 | A1* | 7/2019 | Choi | B60K 1/04 |
| 2019/0263276 | A1* | 8/2019 | Otoguro | B62D 25/20 |
| 2020/0343502 | A1* | 10/2020 | Iwata | B60L 50/64 |
| 2021/0179193 | A1* | 6/2021 | Kim | B60L 50/64 |
| 2021/0221436 | A1* | 7/2021 | Tsuyuzaki | B62D 25/025 |
| 2022/0059894 | A1* | 2/2022 | Stephens | B60K 1/04 |
| 2022/0072943 | A1* | 3/2022 | Kim | B60K 1/04 |
| 2022/0080857 | A1* | 3/2022 | Kim | H01M 10/486 |
| 2022/0081040 | A1* | 3/2022 | Choi | B62D 21/03 |
| 2022/0105991 | A1* | 4/2022 | Kim | B62D 25/20 |
| 2022/0118842 | A1* | 4/2022 | Inoue | B60K 1/04 |
| 2022/0144063 | A1* | 5/2022 | Tatsuwaki | B60L 50/64 |
| 2022/0144064 | A1* | 5/2022 | Tatsuwaki | H01M 50/204 |
| 2022/0153111 | A1* | 5/2022 | Tatsuwaki | H01M 50/298 |
| 2022/0153112 | A1* | 5/2022 | Tatsuwaki | H01M 50/188 |
| 2022/0161855 | A1* | 5/2022 | Tatsuwaki | B60K 1/04 |
| 2022/0227214 | A1* | 7/2022 | Yaita | B60L 50/64 |
| 2022/0227215 | A1* | 7/2022 | Ishizaki | B60L 58/26 |
| 2022/0258585 | A1* | 8/2022 | Yaita | H01M 50/249 |
| 2022/0258620 | A1* | 8/2022 | Iemura | B60K 1/04 |
| 2022/0314771 | A1* | 10/2022 | Toda | B60K 1/04 |
| 2022/0379967 | A1* | 12/2022 | Natsume | B60K 1/04 |
| 2023/0095674 | A1* | 3/2023 | Inami | B60L 50/66 180/65.1 |
| 2023/0100068 | A1* | 3/2023 | Inami | B60K 1/00 296/193.07 |
| 2023/0101665 | A1* | 3/2023 | Inami | B60H 1/00557 180/68.5 |
| 2023/0103246 | A1* | 3/2023 | Inami | B62D 25/2018 296/204 |
| 2023/0373289 | A1* | 11/2023 | Grosse | B60L 50/66 |

FOREIGN PATENT DOCUMENTS

| | | |
|---|---|---|
| JP | H11307139 | 11/1999 |
| JP | 5503087 | 5/2014 |
| JP | 2014194907 | 10/2014 |
| JP | 5967477 | 8/2016 |
| JP | 2016139522 | 8/2016 |
| JP | 2019091556 | 6/2019 |
| JP | 2019169411 | 10/2019 |
| JP | 2019200984 | 11/2019 |
| JP | 2020037376 | 3/2020 |
| JP | 2020111101 | 7/2020 |
| WO | 2013061541 | 5/2013 |
| WO | 2013084942 | 6/2013 |

OTHER PUBLICATIONS

"Office Action of Japan Counterpart Application", issued on Nov. 21, 2023, with English translation thereof, p. 1-p. 6.

"Office Action of China Counterpart Application", issued on Dec. 28, 2023, with English translation thereof, p. 1-p. 13.

* cited by examiner

VEHICLE BODY LOWER STRUCTURE

CROSS-REFERENCE TO RELATED APPLICATION

This application claims the priority benefit of Japan application serial no. 2020-192780, filed on Nov. 19, 2020. The entirety of the above-mentioned patent application is hereby incorporated by reference herein and made a part of this specification.

BACKGROUND

Technical Field

The disclosure relates to a vehicle body lower structure.

Related Art

As a vehicle body lower structure, for example, a structure is known which includes a battery pack tray on which a battery module is mounted, and a battery pack configured from a cover member attached to an upper surface of the battery pack tray via a seal member (for example, see Patent literature 1).

LITERATURE OF RELATED ART

Patent Literature

[Patent literature 1] Japanese Patent No. 5967477

However, the vehicle body lower structure described in Patent literature 1 requires a special cover for covering connection portions of an electric cable including electric components such as a conductor and a fuse to protect the connection portions from water splash when water enters the inside of the battery pack from the seal member.

SUMMARY

According to an embodiment, the disclosure provides a vehicle body lower structure that can suppress water splash without covering connection portions of an electric cable with a special cover.

According to an embodiment, the disclosure proposes a vehicle body lower structure according to the disclosure is a vehicle body lower structure (for example, a vehicle body lower structure 11 of the embodiment) including a battery pack (for example, a battery pack 20 of the embodiment) that encloses a drive battery (for example, a drive battery 70 of the embodiment). The battery pack includes a tray (for example, a tray 21 of the embodiment) and a cover member (for example, a cover member 23 of the embodiment) attached to an upper surface of the tray with a seal member (for example, a seal member 22 of the embodiment) interposed, the seal member making the inside of the battery pack liquid-tight. A battery terminal (for example, a battery terminal 81 of the embodiment), a high-voltage junction box (for example, a high-voltage junction box 82 of the embodiment), a control device (for example, a control device 83 of the embodiment), and a switch (for example, a switch 84 of the embodiment), which are connection portions of an electric cable, are arranged above the seal member.

DESCRIPTION OF THE EMBODIMENTS

Figure 1:
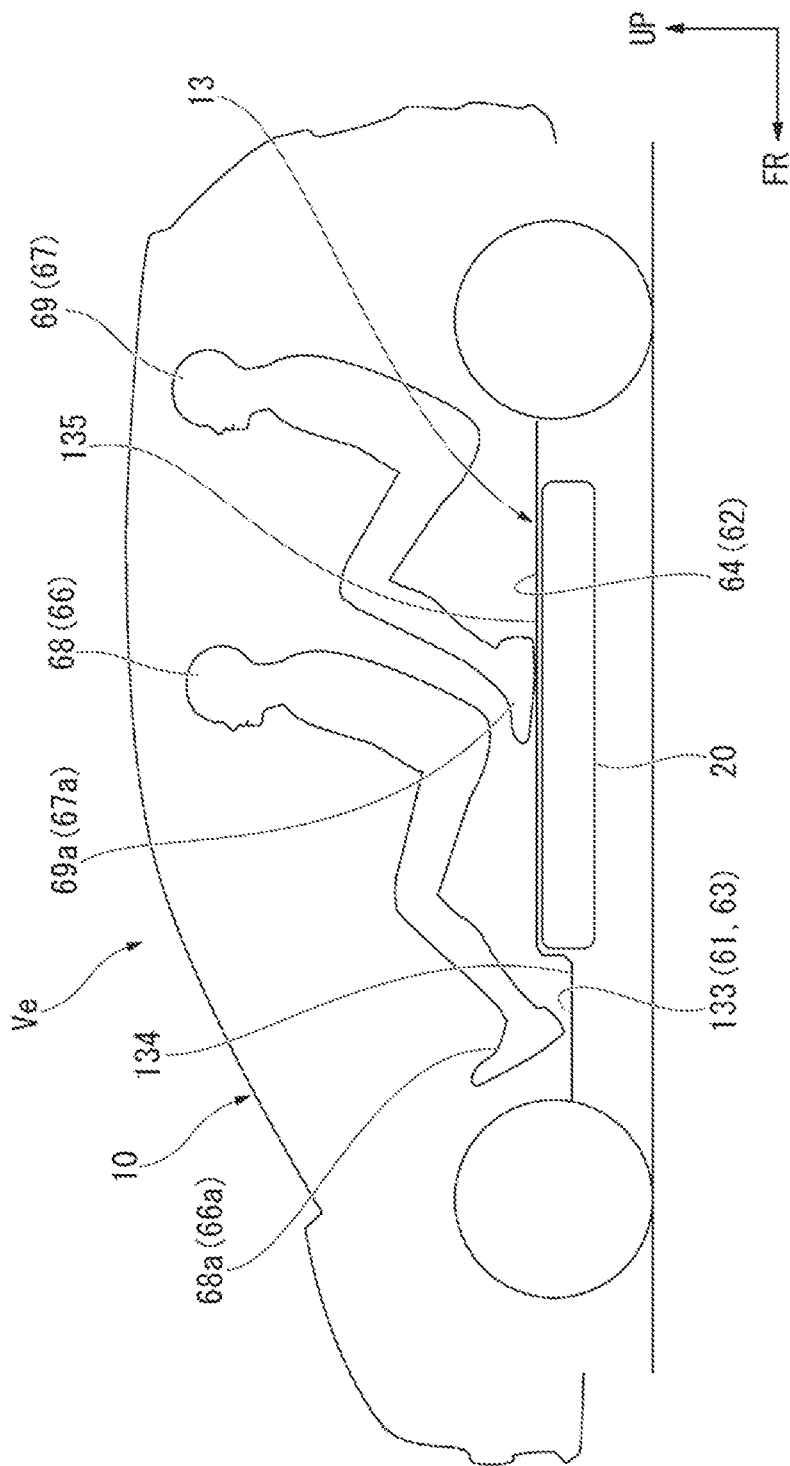
FIG. 1 is a schematic view of a battery pack-mounted vehicle according to an embodiment of the disclosure as viewed from the left side.

A vehicle body lower structure of a battery pack-mounted vehicle according to an embodiment of the disclosure is described below with reference to the drawings. In the drawings, an arrow FR indicates the front of the vehicle, an arrow UP indicates the upper side of the vehicle, and an arrow LH indicates the left side of the vehicle. In addition, the battery pack-mounted vehicle has a substantially symmetrical configuration. Therefore, hereinafter, the left and right constituent members are denoted by the same reference numerals and described.

<Vehicle Body Lower Structure>

Figure 2:
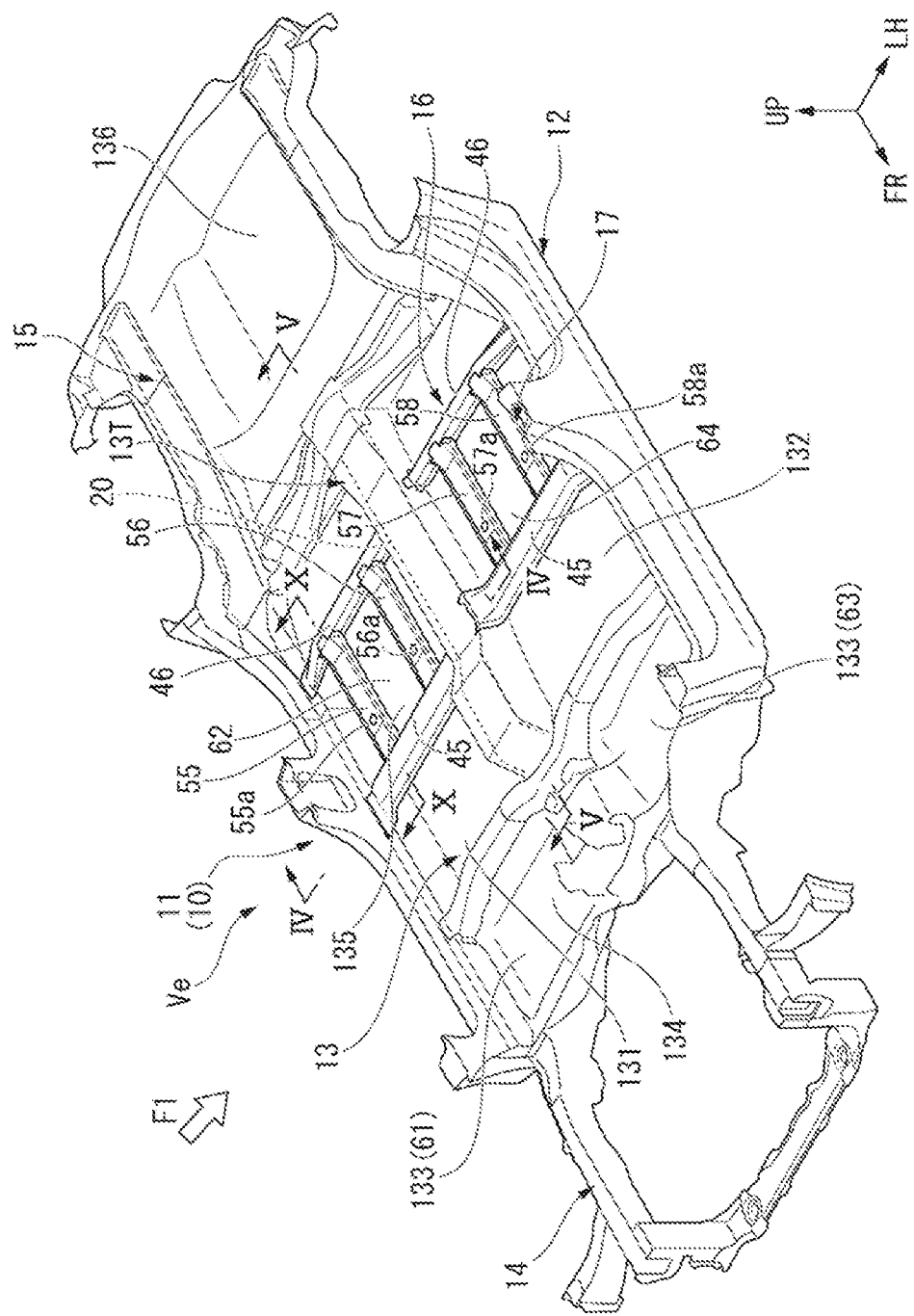
FIG. 2 is a perspective view of a vehicle body lower structure of an embodiment as viewed diagonally from the front.
Figure 3:
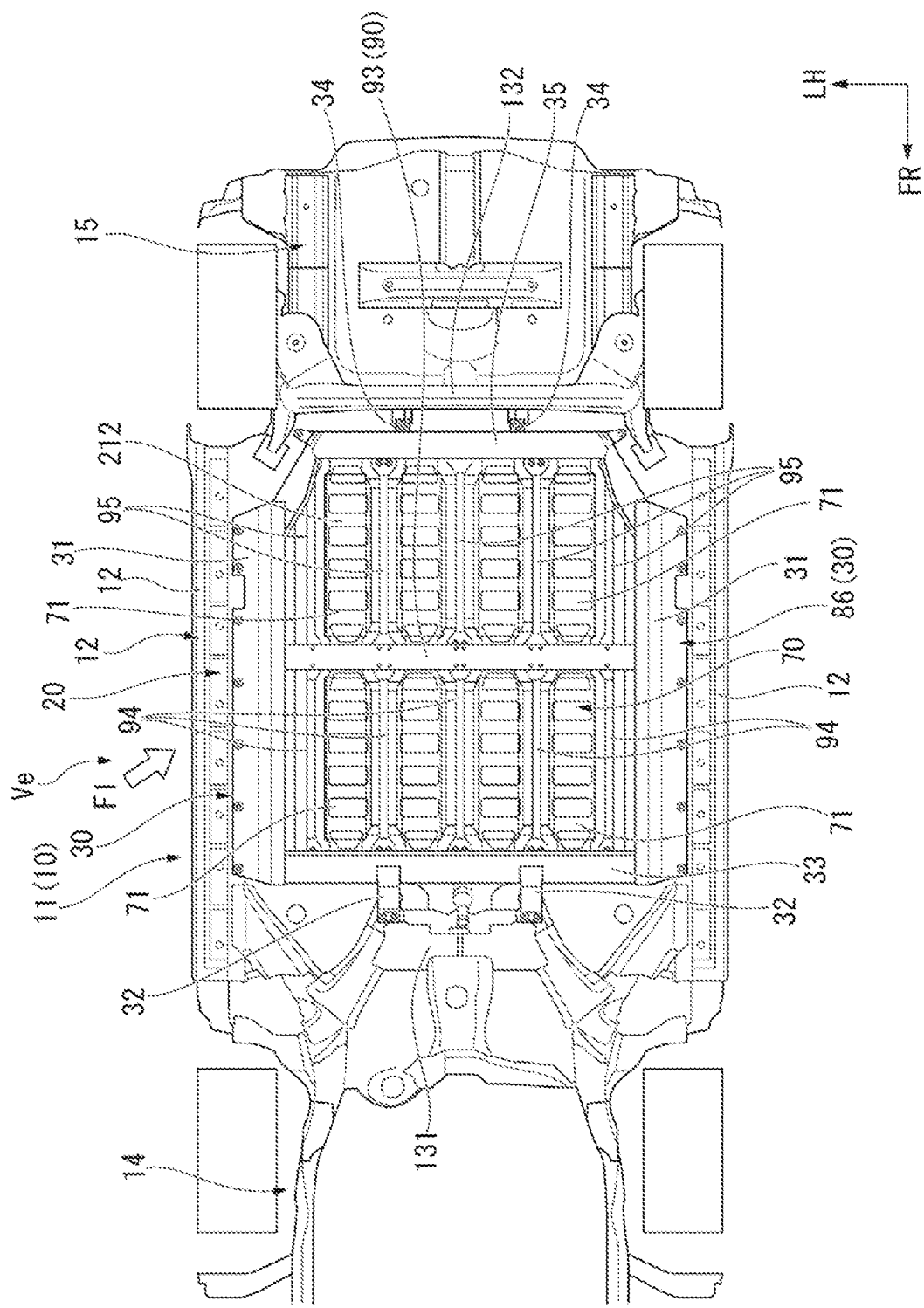
FIG. 3 is a bottom view showing the vehicle body lower structure of an embodiment.

As shown in FIGS. 1 to 3, a battery pack-mounted vehicle Ve includes a vehicle main body 10 (hereinafter, also referred to as a vehicle body 10) including a vehicle body lower structure 11. Hereinafter, the battery pack-mounted vehicle Ve may also be simply referred to as a "vehicle Ve".

The vehicle body lower structure 11 includes a battery pack 20 that encloses a drive battery 70. The vehicle body lower structure 11 includes side sills 12, a floor panel 13, a floor tunnel 13T, a front side frame unit 14, a rear side frame unit 15, a floor cross member unit 16, and a floor vertical frame unit 17.

The side sills 12 include a side sill 12 on the right side and a side sill 12 on the left side. The side sill 12 on the right side is a member having high rigidity, which is formed in a closed cross section and configures a part of the skeleton of the vehicle body 10. The side sill 12 on the right side is arranged on the right outer side in a vehicle width direction, and extends in a vehicle body front-rear direction along a right outer side portion of the floor panel 13 in the vehicle width direction.

The side sill 12 on the left side is member having high rigidity, which is formed in a closed cross section and configures a part of the skeleton of the vehicle body 10. The side sill 12 on the left side is arranged on the left outer side in the vehicle width direction, and extends in the vehicle body front-rear direction along a left outer side portion of the floor panel 13 in the vehicle width direction.

The floor panel 13 is arranged between the side sill 12 on the left side and the side sill 12 on the right side. The floor panel 13 is a plate-shaped member having a substantially rectangular shape in a plan view, and forms a bottom portion of the vehicle body 10. The floor panel 13 includes a first floor portion 131 and a second floor portion 132.

The first floor portion 131 is arranged on the right side in the vehicle width direction (one side in the vehicle width direction) between the side sill 12 on the right side and the floor tunnel 13T. The second floor portion 132 is arranged on the left side in the vehicle width direction (the other side in the vehicle width direction) between the side sill 12 on the left side and the floor tunnel 13T.

The floor tunnel 13T extends in the vehicle body front-rear direction between the first floor portion 131 and the second floor portion 132. The floor tunnel 13T is raised upward from the floor panel 13.

As shown in FIG. 1 and FIG. 2, the first floor portion 131 has a first front footrest (a footrest) 61 which is a recess portion 133 recessed downward and a first rear footrest (a footrest) 62.

The first forefoot 61 is arranged in a section closer to the front of the vehicle body than the battery pack 20. A foot 66a of an occupant 66 seated on a right front seat (a seat, not shown) is placed on the first front footrest 61. The first rear footrest 62 is arranged above the battery pack 20. A foot 67a of an occupant 67 seated on a right rear seat (a seat, not shown) is placed on the first rear footrest 62.

In addition, the second floor portion 132 has a second front footrest (a footrest) 63 which is a recess portion 133 recessed downward and a second rear footrest (a footrest) 64.

The second front footrest 63 is arranged in a section closer to the front of the vehicle body than the battery pack 20. A foot 68a of an occupant 68 seated on a left front seat (a seat, not shown) is placed on the second front footrest 63. The second rear footrest 64 is arranged above the battery pack 20. A foot 69a of an occupant 69 seated on a left rear seat (a seat, not shown) is placed on the second rear footrest 64.

Additionally, in the embodiment, an example is described in which the first front footrest 61, the second front footrest 63, the first rear footrest 62, and the second rear footrest 64 are arranged on the floor panel 13, but the disclosure is not limited thereto. As another example, for example, either the first front footrest 61 and the second front footrest 63 or the first rear footrest 62 and the second rear footrest 64 may be arranged on the floor panel 13.

In addition, in the floor panel 13, a front floor panel (a front floor portion) 134 is formed in a section at the front of the vehicle body of the battery pack 20, and a middle floor panel (a main floor portion) 135 is formed in a section above the battery pack 20. The front floor panel 134 has the first front footrest 61 and the second front footrest 63. The middle floor panel 135 has the first rear footrest 62 and the second rear footrest 64. The middle floor panel 135 is joined to each upper end of the side sill 12 on the right side and the side sill 12 on the left side.

(Battery Pack)

Figure 4:
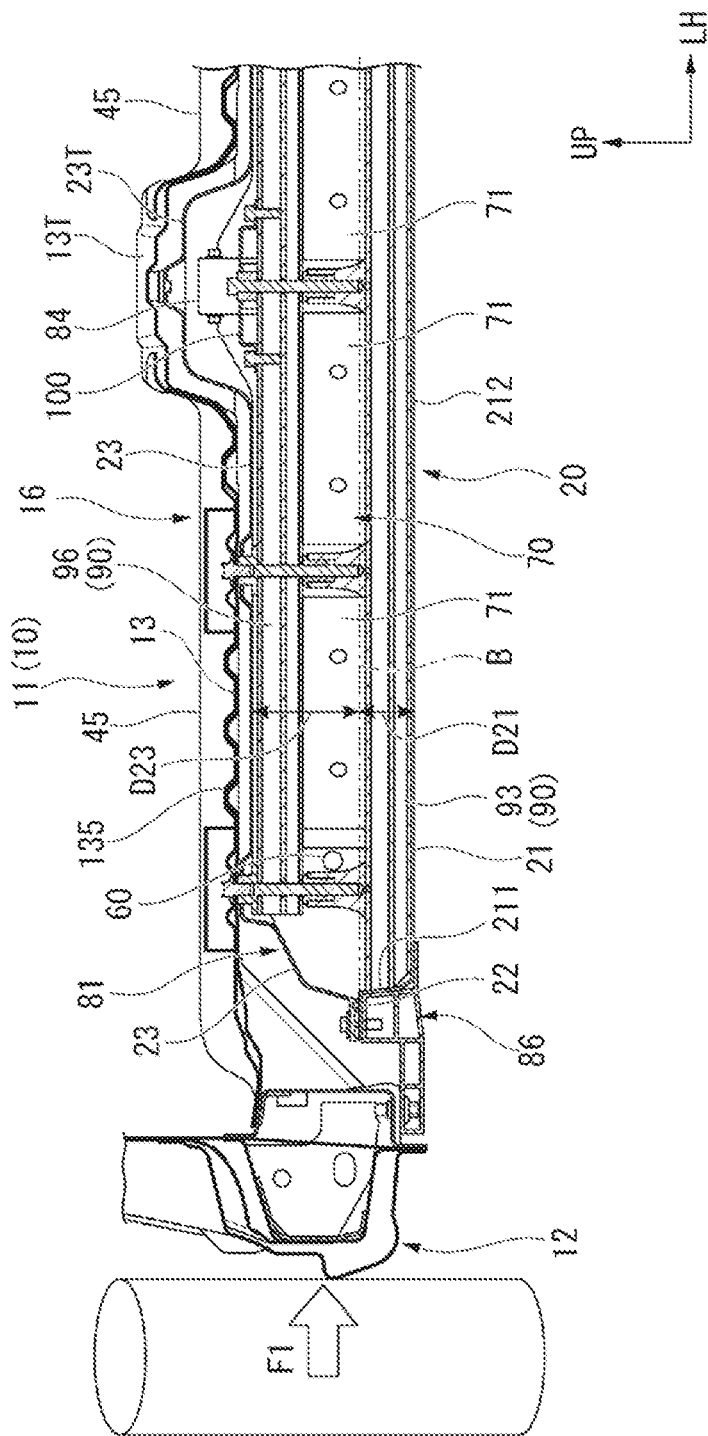
FIG. 4 is a cross-sectional view of the vehicle body lower structure in FIG. 2 broken along a line IV-IV.
Figure 5:
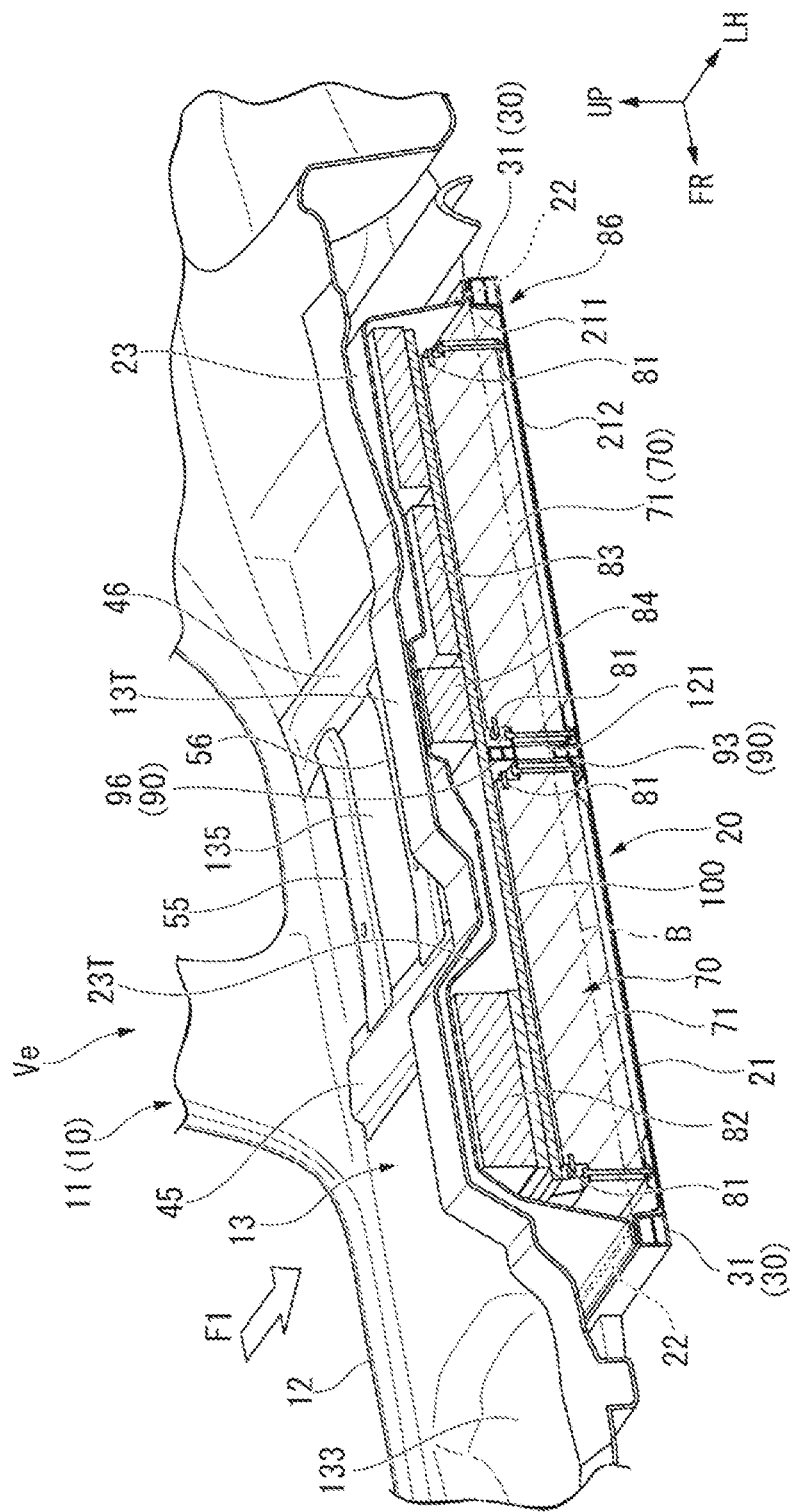
FIG. 5 is a cross-sectional view of the vehicle body lower structure in FIG. 2 broken along a line V-V.

As shown in FIG. 4 and FIG. 5, the vehicle body lower structure 11 includes the floor panel 13 and the battery pack 20 that encloses the drive battery 70.

The battery pack 20 is arranged below the floor panel 13.

The battery pack 20 includes a tray 21 and a cover member 23 attached to an upper surface of the tray 21 with a seal member 22 interposed, the seal member 22 making the inside of the battery pack 20 liquid-tight. Additionally, the upper surface of the tray 21 and a lower surface of the cover member 23 in contact with the seal member 22 are preferably arranged on the same plane or the same horizontal plane. The seal member 22 is preferably arranged on the same plane or the same horizontal plane.

Here, as shown in FIG. 5, a battery terminal 81, a high-voltage junction box 82, a control device 83 including an electronic control unit (ECU), and a switch 84 which are connection portions of an electric cable are arranged above the seal member 22. Therefore, even if water enters the inside of the battery pack 20 from the seal member 22 due to collision with an obstacle or the like, because the inside of the cover member 23 is airtight, an air pocket is formed inside the cover member 23 in the same manner that an air pocket is formed inside a bath tub when the mouth of the bath tub is penetrated downward into the bath water surface. Therefore, water does not enter the inside of the cover member 23, and the battery terminal 81, the high-voltage junction box 82, the control device 83, and the switch 84, which are the connection portions of the electric cable, are resistant to water splash. Thereby, the need for a measure against water splash such as the arrangement of a special cover such as a splash shield (a cover) or the like that specially protects the connection portions of the electric cable from water splash can be eliminated.

In addition, above a plurality of battery modules 71, a deck 100 is arranged at a second boundary portion 122 in the center in the vehicle width direction among a plurality of second boundary portions 122 (see FIG. 6) formed along the front-rear direction between the battery modules 71 which are adjacent to each other in the vehicle width direction. The deck 100 includes a battery auxiliary machine such as the high-voltage junction box 82 or the like.

The high-voltage junction box 82 is, for example, an auxiliary machine that supplies electricity of the drive battery 70 to a drive motor (not shown). The control device 83 is, for example, a battery management unit that controls discharge and charge between the drive battery 70 and the drive motor.

Figure 11:
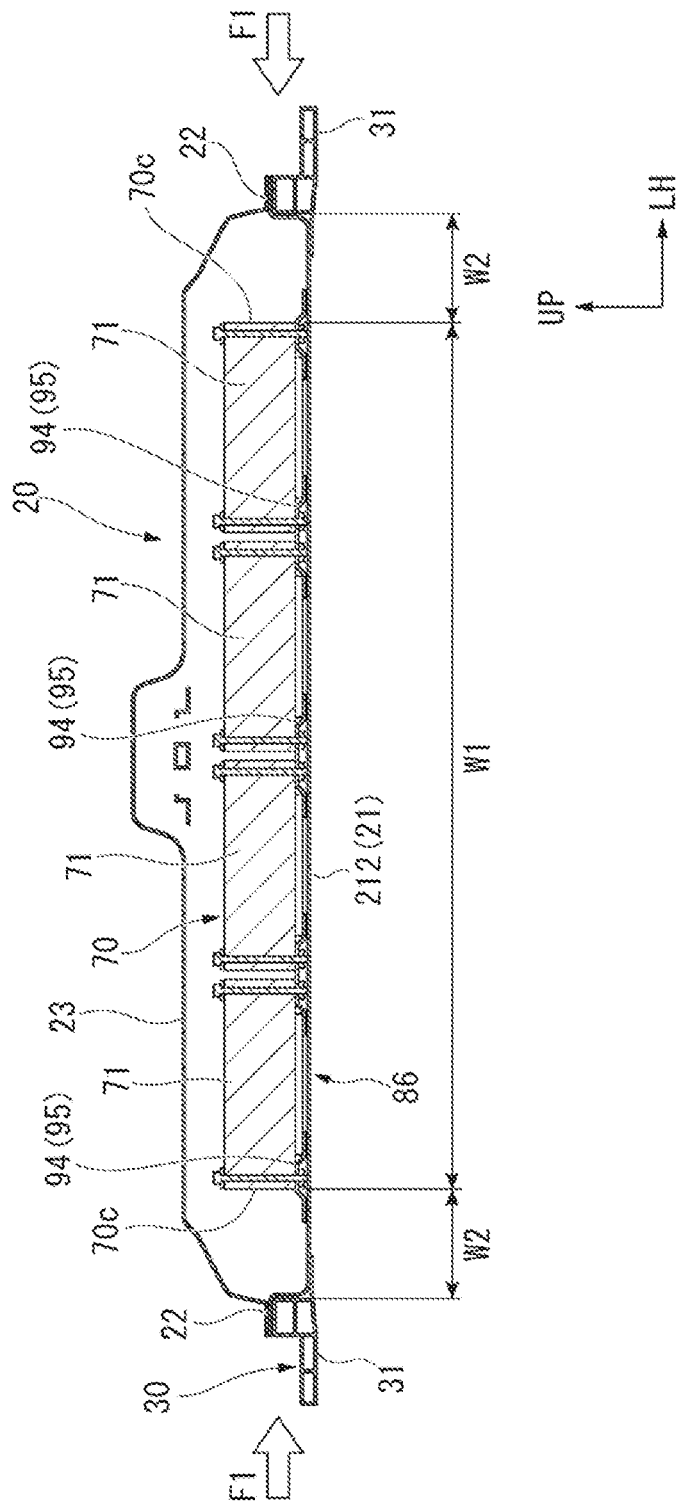
FIG. 11 is a cross-sectional view of the battery pack of an embodiment broken at the first boundary portion.

In this way, the auxiliary machine such as the high-voltage junction box 82 or the like is arranged above the drive battery 70 in the substantially center in the vehicle width direction and between the plurality of battery modules 71 (that is, the second boundary portion 122 in the substantially center in the vehicle width direction). Therefore, a width dimension W1 (see FIG. 8 and FIG. 11) of the drive battery 70 in the vehicle width direction can be suppressed to be small without impairing the capacity of the drive battery 70. Thereby, for example, a space for collision stroke W2 (see FIG. 8 and FIG. 11) that allows deformation caused by a side collision load F1 can be set large.

The high-voltage junction box 82, the control device 83, and the switch 84 may be arranged on the inner side of the floor tunnel 13T of the floor panel 13. Specifically, the high-voltage junction box 82, the control device 83, and the switch 84 may be arranged between a lower surface of the floor tunnel 13T of the floor panel 13 and an upper surface of the battery module 71 (the drive battery 70). According to this configuration, the high-voltage junction box 82, the control device 83, and the switch 84 are arranged on the inner side of the floor tunnel 13T. Therefore, these connection portions of the electric cable can be prevented from being arranged in the front-rear direction of the battery module 71 (the drive battery 70). In addition, a space on the inner side of the floor tunnel 13T can be effectively used. Thereby, compared with the case where, for example, the connection portions of the electric cable are arranged in the front-rear direction of the battery module 71, the connection portions of the electric cable such as the high-voltage junction box 82 and the like can be made more resistant to water splash. In addition, because the dimension of the battery pack 20 in the front-rear direction can be reduced compared with the case in which the connection portions of the electric cable such as the high-voltage junction box 82 and the like are arranged in the front-rear direction of the battery module 71 (the drive battery 70), the battery pack 20 can be made smaller and lighter, for example.

As shown in FIGS. 4 to 10, the high-voltage junction box 82, the control device 83, and the switch 84 may be fixed to an upper surface of the deck 100 which is fixed to a cross member 90. The deck 100 extends along the front-rear direction in the substantially center in the vehicle width direction. According to this configuration, the high-voltage junction box 82, the control device 83, and the switch 84 are fixed to the upper surface of the deck 100 which is fixed to the cross member 90. Therefore, even if the tray 21 becomes shallow, the tray 21 can be reinforced by the deck 100 and the cross member 90. Thereby, for example, the bending rigidity of the tray 21 or the battery pack 20 can be increased. In addition, for example, the vibration amplitude of low-order bending vibration of a bottom wall 212 can be reduced, and the tray 21 or the battery pack 20 can be made difficult to vibrate.

(Case Main Body)

Figure 6:
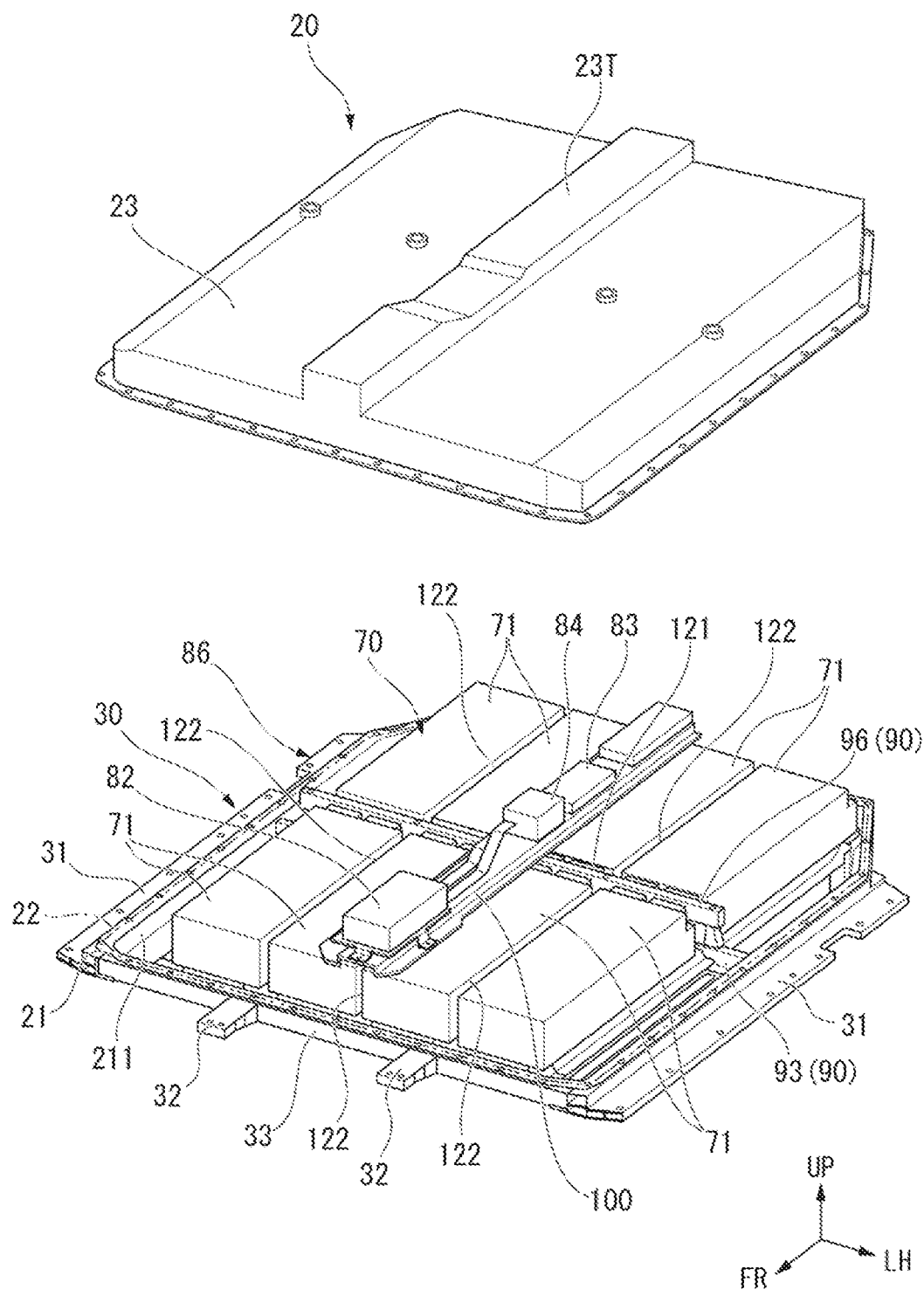
FIG. 6 is a perspective view showing a state in which a cover member is removed from a battery pack of an embodiment.
Figure 7:
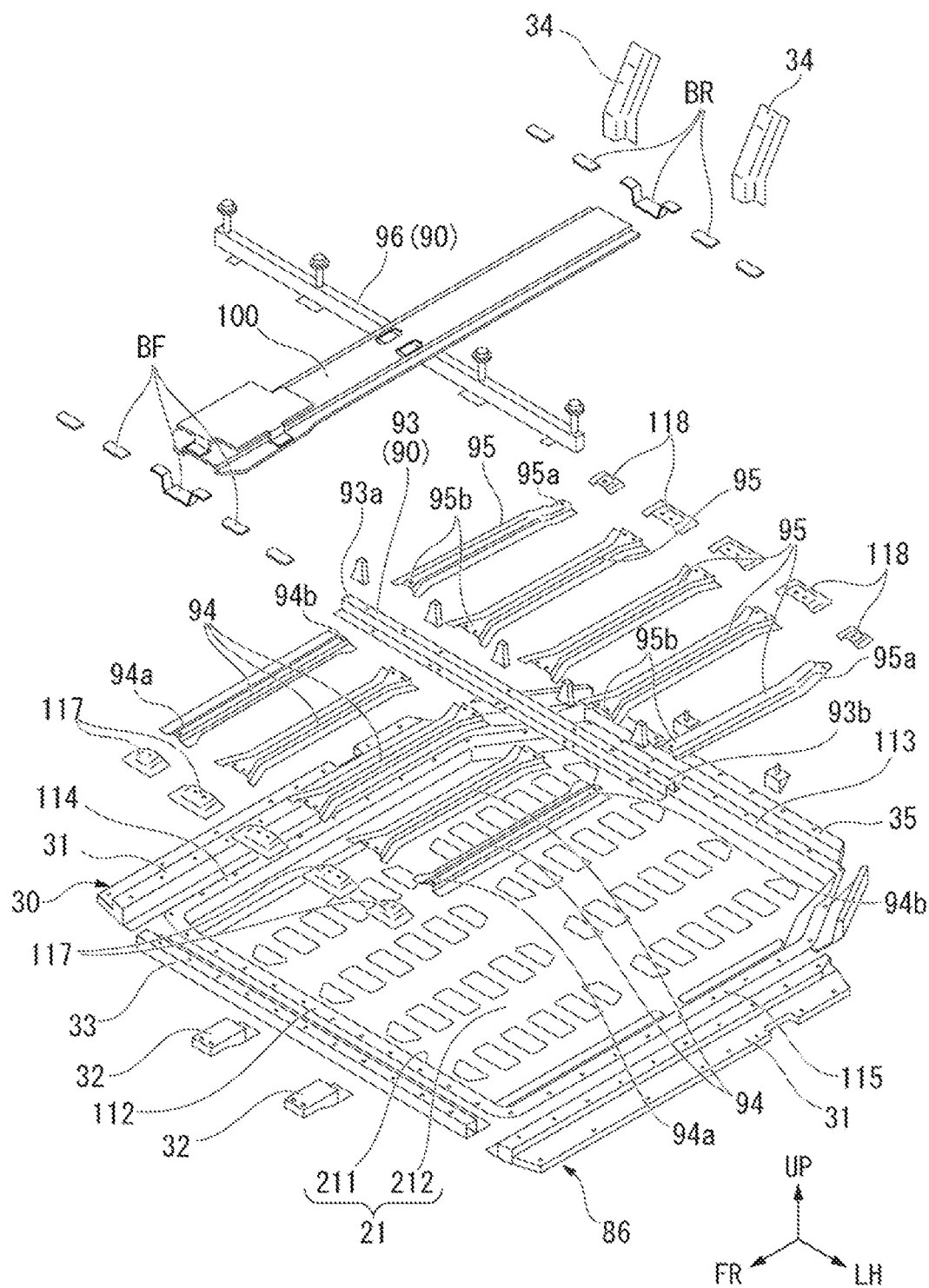
FIG. 7 is an exploded perspective view showing the battery pack in FIG. 6.

As shown in FIG. 6 and FIG. 7, the battery pack 20 includes a case main body 86 and a cover member 23. The case main body 86 includes a frame 30, the tray 21, a lower cross member (a cross member) 93, a first vertical frame (a front vertical frame, a vertical frame) 94, and a second vertical frame (a rear vertical frame, a vertical frame) 95, an upper cross member 96, and the deck 100.

The frame 30 includes a front beam 33, a rear beam 35, and side beams 31. The front beam 33 is arranged at the front of the vehicle body at an interval with respect to a front edge of the drive battery 70 and extends in the vehicle width direction. The rear beam 35 is arranged at the rear of the vehicle body at an interval with respect to a rear edge of the drive battery 70 and extends in the vehicle width direction. The side beams 31 are arranged in the vehicle width direction at an interval with respect to the right edge and the left edge of the drive battery 70, and extend from a right end portion and a left end portion of the front beam 33 toward the rear of the vehicle body.

Figure 15:
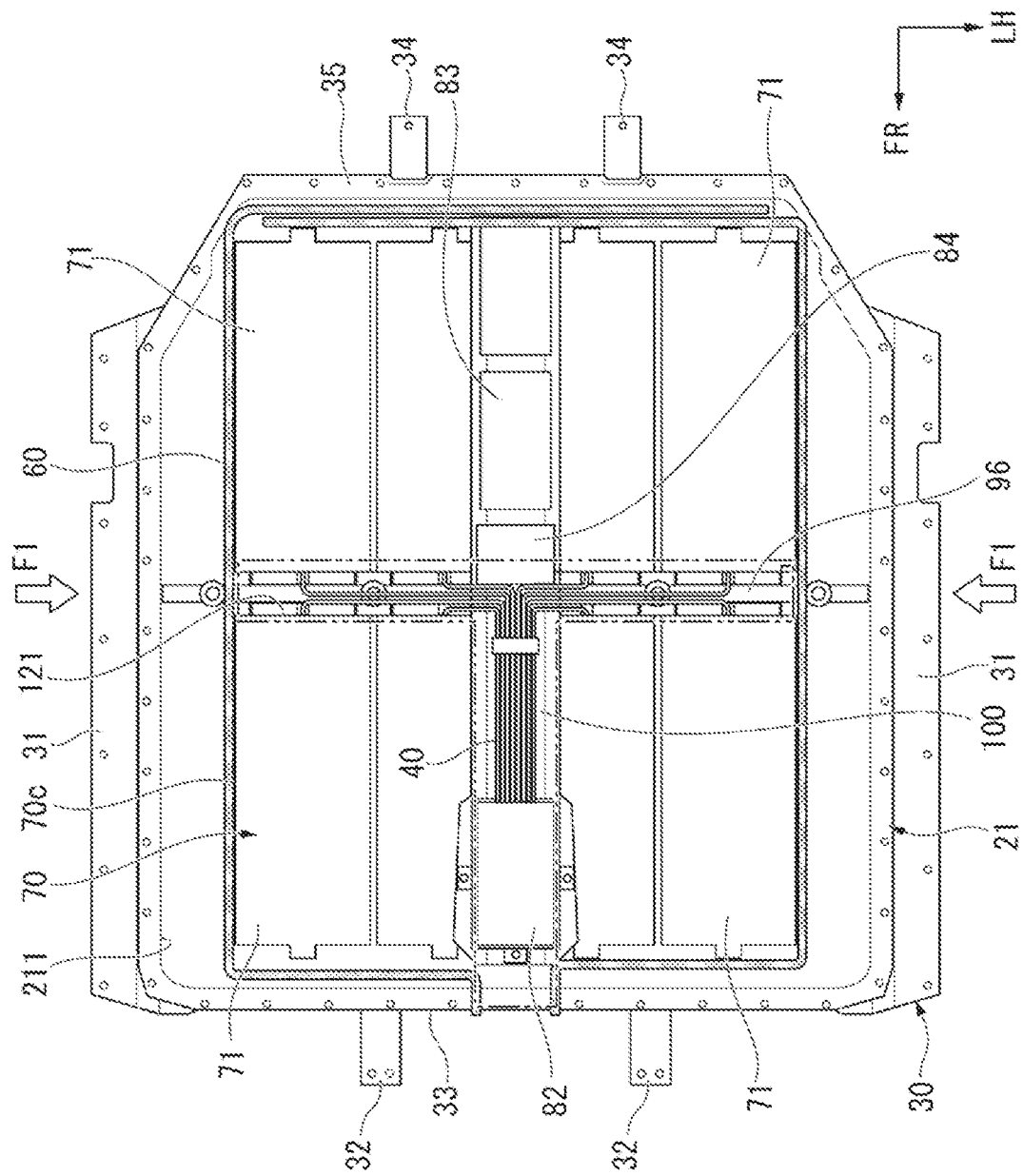
FIG. 15 is a plan view showing a state in which the cover member is removed from the battery pack of an embodiment.

As shown in FIGS. 3, 6, and 15, the frame 30 is formed in a substantially rectangular frame shape in a plan view by the front beam 33, the rear beam 35, and the side beams 31. The frame 30 is formed to cover an outer periphery of the drive battery 70 at an interval.

The side beam 31 is attached to an inner panel of the side sill 12 from below.

Returning to FIGS. 5 to 7, the frame 30 is attached to an outer periphery of the tray 21. The tray 21 is attached inside the frame 30 and is arranged below the drive battery 70.

Specifically, the tray 21 has the bottom wall (a bottom portion of the battery pack 20) 212 and a peripheral wall 211.

The bottom wall 212 is arranged below the drive battery 70 and is formed in a substantially rectangular shape in a plan view. The bottom wall 212 forms the bottom portions of the battery pack 20 and the case main body 86. The peripheral wall 211 is formed along an outer periphery of the bottom wall 212. The peripheral wall 211 has a case front wall 112, a case rear wall 113, a case right wall 114, and a case left wall 115. The lower cross member 93, a plurality of first vertical frames 94, and a plurality of second vertical frames 95 are arranged on the tray 21.

The lower cross member 93 is arranged in the center of the tray 21 in the vehicle body front-rear direction and is extended toward the vehicle width direction. In the lower cross member 93, for example, a right end portion 93a is in contact with the case right wall 114, and a left end portion 93b is in contact with the case left wall 115. The plurality of first vertical frames 94 are arranged at an interval in the vehicle width direction at the front of the vehicle body of the lower cross member 93 in the bottom wall 212. The plurality of second vertical frames 95 are arranged at an interval in the vehicle width direction at the rear of the vehicle body of the lower cross member 93 in the bottom wall 212.

The plurality of first vertical frames 94 and the plurality of second vertical frames 95 are arranged on the same line at an interval in the vehicle body front-rear direction. The lower cross member 93 is arranged between the plurality of first vertical frames 94 and the plurality of second vertical frames 95.

In the embodiment, one lower cross member 93 is exemplified, but the number of the lower cross members 93 can be selected as appropriate. In addition, in the embodiment, five first vertical frames 94 are exemplified as the plurality of first vertical frames 94, and five second vertical frames 95 are exemplified as the plurality of second vertical frames 95, but the number of the first vertical frames 94 and the second vertical frames 95 can be selected as appropriate.

A front end portion 94a of the first vertical frame 94 is attached to the front beam 33 by a first attachment bracket 117 via the bottom wall 212. In addition, a rear end portion 94b of the first vertical frame 94 is attached to the lower cross member 93. The battery module 71 is vertically arranged between a pair of first vertical frames 94 adjacent to each other, and the vertically arranged battery module 71 is supported by the pair of first vertical frames 94.

A rear end portion 95a of the second vertical frame 95 is attached to the rear beam 35 by a second attachment bracket 118 via the bottom wall 212. In addition, a front end portion 95b of the second vertical frame 95 is attached to the lower cross member 93.

The battery module 71 is vertically arranged between a pair of second vertical frames 95 adjacent to each other, and the vertically arranged battery module 71 is supported by the pair of second vertical frames 95.

The battery module 71 is formed into a vertically-long rectangular body by stacking a plurality of battery cells (not shown) in the longitudinal direction. Hereinafter, the battery module 71 which is vertically-long may also be referred to as a "vertically-long battery module 71".

In addition, vertically arranging the vertically-long battery module 71 means arranging the battery module 71 with the longitudinal direction of the battery module 71 facing the vehicle body front-rear direction (vertical direction).

In this way, the plurality of first vertical frames 94 and the plurality of second vertical frames 95 are arranged toward the vehicle body front-rear direction on the bottom wall 212 of the tray 21 at an interval in the vehicle body front-rear direction. Furthermore, the lower cross member 93 is arranged between the plurality of first vertical frames 94 and the plurality of second vertical frames 95.

Therefore, in case regions at the front and rear of the vehicle body of the lower cross member 93 (an internal space of the battery pack 20), the plurality of vertically-long battery modules 71 can be vertically arranged toward the vehicle body front-rear direction along the plurality of first vertical frames 94 and the plurality of second vertical frames 95. Thereby, the plurality of vertically-long battery modules 71 can be vertically arranged with high efficiency, and thus a sufficient cruising distance of the vehicle Ve can be secured.

In this way, the tray 21 may include the frame 30 having: the side beam 31 fixed to the lower surface of the side sill 12, the front beam 33 fixed to the front floor panel 134 via a stay 32, and the rear beam 35 fixed to a rear floor panel 136 (a rear floor portion of the floor panel 13) via a bracket 34.

According to this configuration, the tray 21 includes the frame 30 having: the side beam 31 fixed to the lower surface of the side sill 12, the front beam 33 fixed to the front floor panel 134 via the stay 32, and the rear beam 35 fixed to the rear floor panel 136 via the bracket 34. Therefore, the tray 21 can be fixed to the side sill 12, the front floor panel 134, and the rear floor panel 136. Thereby, for example, the battery pack 20 having a sufficient battery capacity can be mounted under the floor even if the ground clearance of the vehicle body is secured, and the foot space of the occupant in the front seat can also be secured.

In addition, when a recess portion 133 recessed downward for securing the foot space of the occupant exists at the front floor panel 134, the stay 32 may be horizontally extended and fixed to a lower surface of the front floor panel 134 so that a front end portion of the battery pack 20 is arranged behind the recess portion 133. Thereby, the battery pack 20 can be arranged below the floor panel 13 and behind the recess portion 133. Therefore, the ground clearance of the vehicle body can be secured.

In addition, when the level of the rear floor panel 136 is higher than the level of the front floor panel 134, the bracket 34 may be extended in the vertical direction so that the level of an end portion of the bracket 34 on the rear floor panel 136 side is higher than the level of an end portion of the bracket 34 on the tray 21 side. Thereby, the battery pack 20 can be arranged below the floor panel 13 and in front of the rear floor panel 136. Therefore, the ground clearance of the vehicle body can be secured.

The tray 21 may be made of metal. Therefore, the rigidity of the battery pack 20 can be secured, and the mounted drive battery 70 and the like can be protected. In addition, the cover member 23 may be made of resin. Therefore, the mass density can be reduced compared with a cover member made of metal.

In addition, as shown in FIG. 4, a depth D21 of the tray 21 may be shallower than a depth D23 of the cover member 23. In other words, the depth D23 of the cover member 23 may be deeper than the depth D21 of the tray 21. Here, the depth D23 of the cover member 23 is a distance from an air pocket boundary surface B corresponding to a lowermost surface of the cover member 23 (a surface facing an uppermost surface of the tray 21) to a lower surface of the shallowest part of the cover member 23 in a part excluding a tunnel part 23T arranged below the floor tunnel 13T. In addition, the depth D21 of the tray 21 is a distance from the air pocket boundary surface B corresponding to an uppermost surface of the tray 21 (a surface facing a lowermost surface of the cover member 23) to an upper surface of the shallowest part of the tray 21. Thereby, a large space on the inner side of the cover member 23 and above the boundary surface B can be secured. Additionally, the air pocket boundary surface B represents, for example, a boundary surface between an air pocket region (space) formed inside the cover member 23 and water, which is assumed in a case that water enters the inside of the battery pack 20 when the battery pack 20 is submerged.

Therefore, a large volume of the air pocket when water enters from the seal member 22 is secured, and the cover member 23 which is larger in volume than the tray 21 has a low mass density. Thereby, for example, the connection portions of the electric cable can be made more resistant to water splash. In addition, for example, the weight of the battery pack 20 can be reduced.

As shown in FIGS. 4 to 9, the tray 21 has a cross member 90. The cross member 90 is arranged in a manner of extending along the vehicle width direction from a left side portion (one side portion) to a right side portion (the other side portion) in the peripheral wall 211 of the tray 21. According to this configuration, the cross member 90 can resist the side collision load F1 acting on the tray 21 along the vehicle width direction by a compression reaction force. Therefore, the tray 21 can be effectively reinforced.

The high-voltage junction box 82 and the control device 83 may be separated in the front-rear direction with the cross member 90 as a boundary. According to this configuration, the high-voltage junction box 82 and the control device 83 are separated in the front-rear direction with the cross member 90 as a boundary. Therefore, a load further transmitted from the cross member 90 to which the side collision load F1 is transmitted, and acting on the high-voltage junction box 82 and the control device 83 can be suppressed.

Thereby, for example, the influence of the side collision on the high-voltage junction box 82 and the control device 83 can be reduced.

(Arrangement of Battery Module)

As shown in FIG. 6, the drive battery 70 includes a battery module 71 arranged vertically with the longitudinal direction facing the vehicle body front-rear direction.

At the front of the vehicle body of the lower cross member 93, the plurality of battery modules 71 on the front side are vertically supported by the plurality of first vertical frames 94. At the rear of the vehicle body of the lower cross member 93, the plurality of battery modules 71 on the rear side are vertically supported by the plurality of second vertical frames 95. A front battery unit is configured by the plurality of battery modules 71 on the front side, and a rear battery unit is configured by the plurality of battery modules 71 on the rear side.

The front battery unit and rear battery unit are arranged in a pair in the vehicle body front-rear direction. By the front battery unit (that is, the plurality of battery modules 71 on the front side) and the rear battery unit (that is, the plurality of battery modules 71 on the rear side), for example, a set of the battery modules 71 is configured.

The set of battery modules 71 is supported by the plurality of first vertical frames 94 and the plurality of second vertical frames 95 in a state where the plurality of battery modules 71 are vertically arranged with the longitudinal direction facing the vehicle body front-rear direction.

In the embodiment, an example is described in which the plurality of battery modules 71 on the front side and the plurality of battery modules 71 on the rear side are arranged in a pair in the vehicle body front-rear direction, but the disclosure is not limited thereto. As another example, the plurality of battery modules 71 on the front side and the plurality of battery modules 71 on the rear side may be arranged in three or more rows in the vehicle body front-rear direction.

The set of battery modules 71 has a first boundary portion 121 extending in the vehicle width direction and a second boundary portion 122 extending in the vehicle body front-rear direction (the second boundary portion 122 in the center in the vehicle width direction is not shown) between the plurality of battery modules 71. The first boundary portion 121 extends in the vehicle width direction along the lower cross member 93. The second boundary portion 122 extends in the vehicle body front-rear direction along the first vertical frame 94 and the second vertical frame 95.

Above the set of battery modules 71, the upper cross member 96 is arranged at a position corresponding to the first boundary 121.

Figure 8:
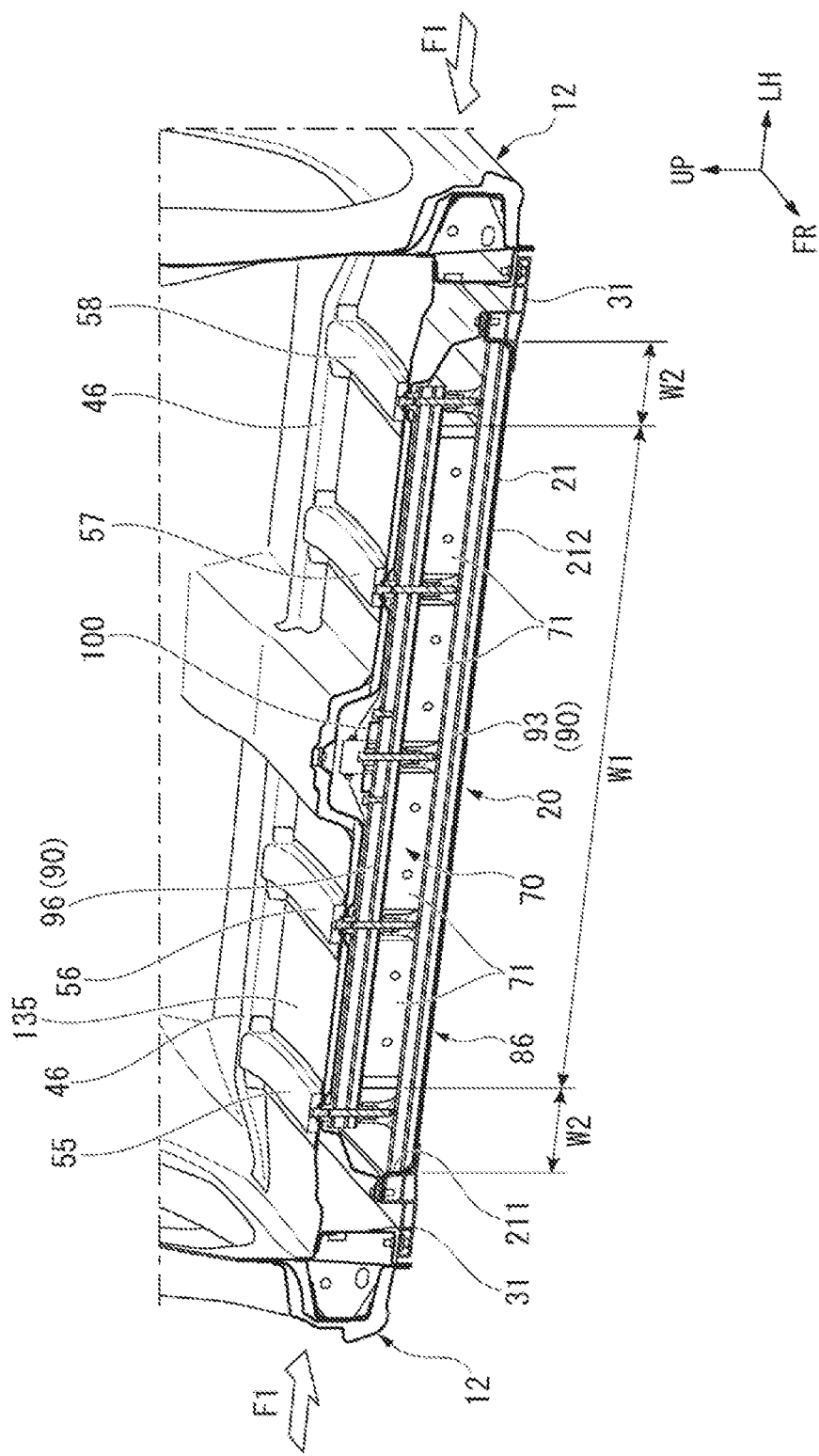
FIG. 8 is a perspective view of the vehicle body lower structure of an embodiment broken at a first boundary portion of the battery pack.
Figure 9:
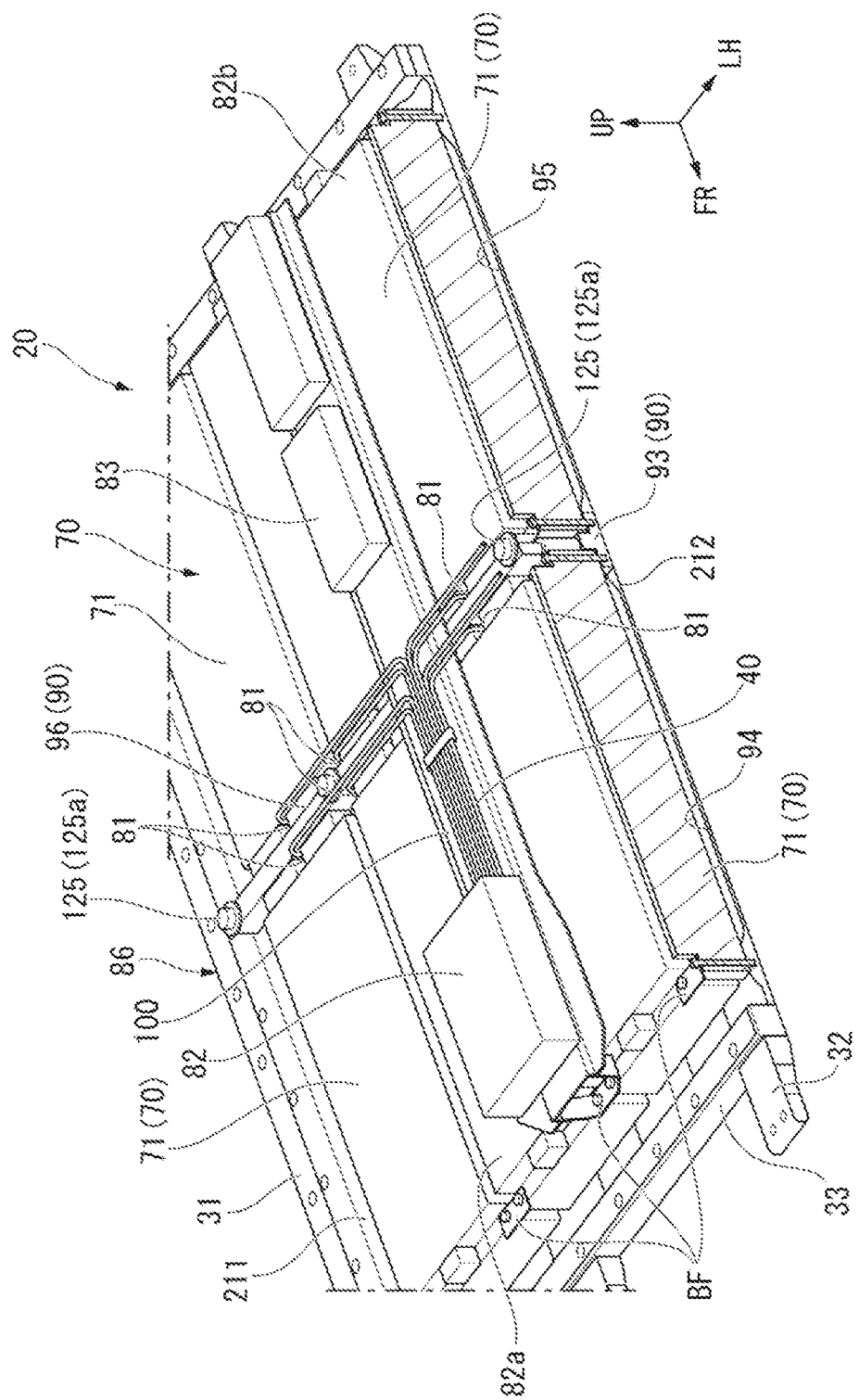
FIG. 9 is a perspective view of the battery pack of an embodiment broken at a second boundary portion.
Figure 10:
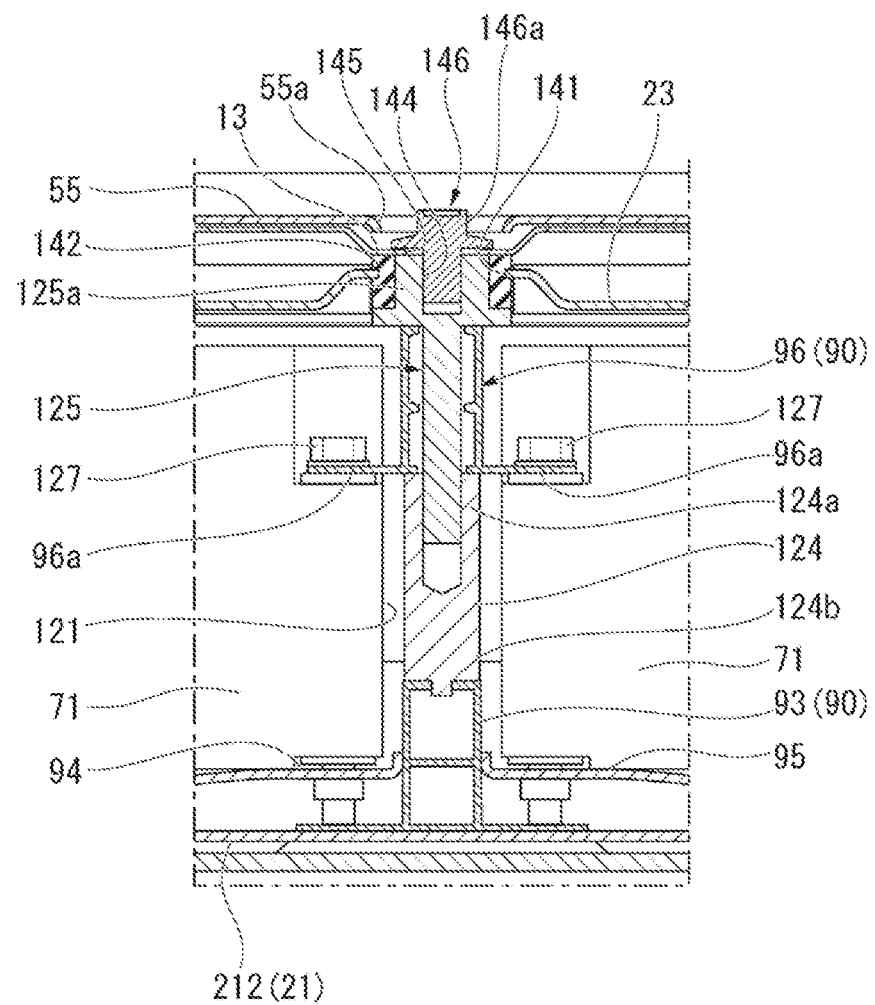
FIG. 10 is a cross-sectional view of the vehicle body lower structure in FIG. 2 broken along a line X-X.

As shown in FIGS. 8 to 10, the upper cross member 96 is arranged along the lower cross member 93. The upper cross member 96 is coupled to an upper end portion 124a of an upper and lower connection collar 124 by an attachment bolt 125. A lower end portion 124b of the upper and lower connection collar 124 is coupled to the lower cross member 93. Therefore, the upper cross member 96 is coupled to the lower cross member 93 via the attachment bolt 125 and the upper and lower connection collar 124.

In this state, a flange 96a of the upper cross member 96 is coupled to the battery module 71 by an attachment bolt 127. Thereby, the plurality of battery modules 71 are fixed from above by the upper cross member 96. Specifically, the upper cross member 96 connects the plurality of battery modules 71 arranged in the vehicle body front-rear direction and connects the plurality of battery modules 71 arranged in the vehicle width direction in the center of the set of battery modules 71 in the vehicle body front-rear direction.

In addition, the plurality of battery modules 71 arranged in the vehicle width direction are connected by front connection brackets BF (see FIG. 7 as well) at a front end portion 82a of the set of battery modules 71. Furthermore, the plurality of battery modules 71 arranged in the vehicle width direction are connected by rear connection brackets BR (see FIG. 7) at a rear end portion 82b of the set of battery modules 71.

In this way, the plurality of battery modules 71 are mounted on the plurality of first vertical frames 94 and the plurality of second vertical frames 95. Furthermore, the plurality of battery modules 71 (that is, the set of battery modules 71) are fixed from above by the upper cross member 96.

Specifically, the plurality of battery modules 71 are connected from above by the upper cross member 96 in the vehicle body front-rear direction and the vehicle width direction in the center of the set of battery modules 71 in the vehicle body front-rear direction. In addition, the front end portion 82a of the set of battery modules 71 is connected in the vehicle width direction by the front connection bracket BF. Furthermore, the rear end portion 82b of the set of battery modules 71 is connected in the vehicle width direction by the rear connection bracket BR.

Thereby, the plurality of vertically-long battery modules 71 (that is, the set of battery modules 71) can be stably fixed, and can be integrally connected in a state that the rigidity of the set of battery modules 71 is secured.

In this way, the battery module 71 may be sandwiched and fixed between the tray 21 and the cross member 90 (the lower cross member 93, the upper cross member 96) or the deck 100.

According to this configuration, the battery module 71 is sandwiched and fixed between the tray 21 and the cross member 90 or the deck 100. Therefore, the battery module 71 can be reliably fixed even if the tray 21 is shallow. Thereby, for example, it is also available not to arrange the frame 30 in the tray 21.

(Electric Wiring)

As shown in FIGS. 5, 6, 9, and 11, the cover member 23 is attached to the tray 21 configuring the case main body 86 from above via the seal member 22 in a state that the drive battery 70, the high-voltage junction box 82, the control device 83, the switch 84, and a high-voltage electric wire 40 (see FIG. 9) are accommodated in the case main body 86. Thereby, the battery pack 20 is assembled and attached under the floor of the vehicle Ve.

Here, for example, in the set of battery modules 71 in which the plurality of battery modules 71 are arranged in the vehicle width direction and the battery modules 71 are arranged in a pair in the vehicle body front-rear direction, the battery terminals 81 of the battery modules 71 can be arranged toward the first boundary portion 121. Therefore, in the space of the first boundary portion 121, the high-voltage electric wire 40 from each battery terminal 81 can be directed along the vehicle width direction by passing toward the center in the vehicle width direction, and each battery terminal 81 can be concentrated in the center of the battery pack 20.

As shown in FIG. 2 and FIG. 5, first floor cross members 45 on the left and right sides are arranged in the vehicle body front direction of the first boundary portion 121, and second floor cross members 46 on the left and right sides are arranged in the vehicle body rear direction of the first boundary portion 121. Additionally, a third floor cross member extending in the vehicle width direction may be arranged at a boundary between the battery pack 20 and the recess portion 133 in the vehicle body front direction of the first floor cross member 45. In this way, because the floor panel 13 includes the first floor cross member 45 and the second floor cross member 46, the side collision load F1 is greatly shared, and thus the electrical components such as the battery terminal 81, the high-voltage electric wire 40, and the like arranged in the first boundary portion 121 can be protected from, for example, the side collision load F1.

Thereby, there is no need to arrange the high-voltage electric wire 40 and the battery terminal 81 on the outer side of the battery module 71 in the vehicle width direction, and thus the space for collision stroke W2 (see FIG. 8, FIG. 11, and the like) that allows deformation caused by the side collision load F1 input by the side collision can be set large, for example.

Here, for example, the battery pack 20 includes the upper cross member 96 above the first boundary portion 121. Therefore, each battery terminal 81 concentrated in the center of the battery pack 20 can be pulled out above the upper cross member 96 to be connected to the high-voltage components such as the control device 83 and the like arranged in the vehicle body front-rear direction, and the high-voltage electric wire 40 can be arranged by being routed to the front of the vehicle body to thereby shorten the wire routing. By shortening the wire routing, cost reduction and weight reduction can be achieved. In addition, because the wire is routed to a highly rigid section of the battery pack 20 which is equipped with the upper cross member 96, damage to the wiring during the vibration of the battery pack 20 due to the vibration of the vehicle body lower structure 11 can be suppressed.

As shown in FIG. 5 and FIG. 9, regarding the pair of battery modules 71 (two of the set of battery modules 71) which are arranged with the cross member 90 (the lower cross member 93, the upper cross member 96) as a boundary, the battery terminals 81 of the battery modules 71 face each other. As shown in FIG. 6 and FIG. 9, plural sets of battery modules 71, which are the battery modules 71 in which the battery terminals 81 face each other and are paired, are arranged along the longitudinal direction of the cross member 90. Here, as shown in FIG. 9 and FIG. 15, the high-voltage electric wire 40 connected to the battery terminal 81 may be wired along the longitudinal direction (the vehicle width direction) of the cross member 90, bundled above the deck 100, and wired along the front-rear direction toward the high-voltage junction box 82.

According to this configuration, the drive battery 70 includes the battery module 71 which is vertically arranged with the longitudinal direction facing the vehicle body front-rear direction. Therefore, the width dimension of the drive battery 70 in the vehicle width direction can be suppressed to be small. Thereby, for example, when the side collision load F1 is input, the allowable deformation space (also referred to as the space for collision stroke) due to the side collision load F1 can be set large. In addition, the plural sets of battery modules 71, which are paired and arranged with the cross member 90 as a boundary in a manner that the battery terminals 81 face each other, are arranged along the longitudinal direction of the cross member 90. Besides, the high-voltage electric wire 40 connected to the battery terminal 81 arranged in each battery module 71 is wired along the longitudinal direction of the cross member 90, bundled above the deck 100, and wired along the front-rear direction toward the high-voltage junction box 82 adjacent to a drive motor (not shown). Thereby, for example, in the side collision, the horizontal wiring of the high-voltage electric wire 40 (from the battery terminal 81 to the bundled part above the deck 100) can be protected by the cross member 90, and the vertical wiring (the part along the front-rear direction from the bundled part above the deck 100) can be less susceptible to the side collision by being arranged on the inner side of the floor tunnel 13T and kept away from the input side of the side collision load F1. Furthermore, for example, the length of the high-voltage electric wire 40 can be shortened by wiring the horizontal wiring and the vertical wiring in a manner of forming a T-shape (for example, a part surrounded by an alternate long and short dash line in FIG. 15) or a +shape.

(Water-Cooled Pipe)

As shown in FIGS. 4, 12, 14, and 15, a water-cooled pipe 60 may be arranged along the peripheral wall 211 of the tray 21 facing an outer surface of the battery module 71 (the drive battery 70). The water-cooled pipe 60 is a pipe for flowing cooling water for cooling the battery module 71. The water-cooled pipe 60 may be arranged in a manner of surrounding the entire drive battery 70 in a plan view as shown in FIG. 15. The water-cooled pipe 60 is located below the position of the high-voltage electric wire 40. According to this configuration, the water-cooled pipe 60 is arranged along the wall surface of the tray 21 facing the outer surface of the battery module 71. Therefore, the water-cooled pipe 60 can be separated from the high-voltage electric wire 40, and the high-voltage electric wire 40 can be suppressed from being splashed with water when the water-cooled pipe 60 is damaged. Thereby, for example, a water splash prevention cover that specially covers the high-voltage electric wire 40 can be eliminated.

(Side Collision Resistance Performance)

As shown in FIG. 3 and FIG. 8, the side beam 31 of the case main body 86 is attached to the side sill 12 from below. The front beam 33 of the case main body 86 is connected to a horizontal beam of the front floor panel 134 via a pair of front connection brackets BF (see FIG. 7 as well). The rear beam 35 of the case main body 86 is connected to a frame rear cross member of the rear floor panel 136 via a pair of rear connection brackets BR (see FIG. 7 as well).

As shown in FIG. 2 and FIG. 10, a head portion 125a of the attachment bolt 125 penetrates a through hole 141 of the cover member 23 and is in contact with the floor panel 13 above. In addition, a rubber member 142 arranged on the head portion 125a penetrates the through hole 141 of the cover member 23 and is in contact with the floor panel 13 above.

A female screw 144 of the head portion 125a is arranged downward in accordance with an attachment hole 145 of the floor panel 13. An attachment bolt 146 is screw-coupled to the female screw 144 of the head portion 125a through the attachment hole 145 of the floor panel 13. A head portion 146a of the attachment bolt 146 projects upward from through holes 55a to 58a at the top of a first floor vertical frame 55 to a fourth floor vertical frame 58.

Here, the left and right flanges of the first floor vertical frame 55 to the fourth floor vertical frame 58 are joined to the floor panel 13. Therefore, the battery pack 20 is fixed to the first floor vertical frame 55 to the fourth floor vertical frame 58 via the floor panel 13.

Thereby, the battery pack 20 is assembled under the floor of the vehicle Ve. In this state, the plurality of battery modules 71 of the drive battery 70 accommodated in the battery pack 20 are arranged in a state of being vertically arranged with the longitudinal direction facing the vehicle body front-rear direction (see FIG. 6 as well).

In this way, according to the vehicle body lower structure 11 according to the embodiment, as shown in FIG. 8, the width dimension W1 in the vehicle width direction of the drive battery 70 configured by the plurality of battery modules 71 can be suppressed to be small. Therefore, for example, when the side collision load F1 is input to the side portion of the vehicle Ve due to side collision, the space for collision stroke (also referred to as the allowable deformation space) W2 due to the side collision load F1 can be set large.

Figure 12:
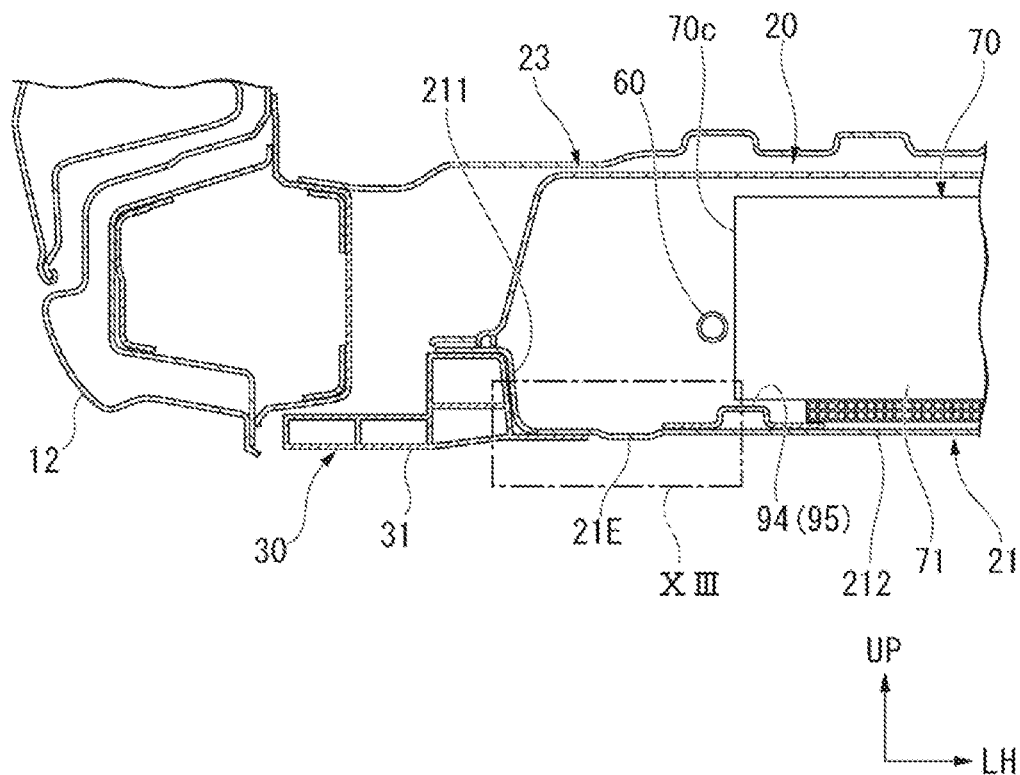
FIG. 12 is a cross-sectional view showing a tray deformation region of the battery pack of an embodiment.
Figure 13:
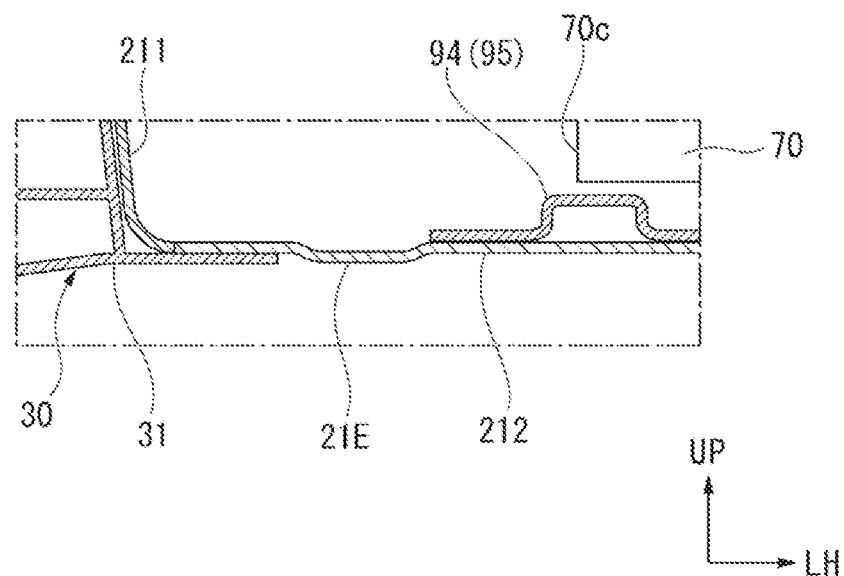
FIG. 13 is an enlarged cross-sectional view of a part XIII in FIG. 12.
Figure 14:
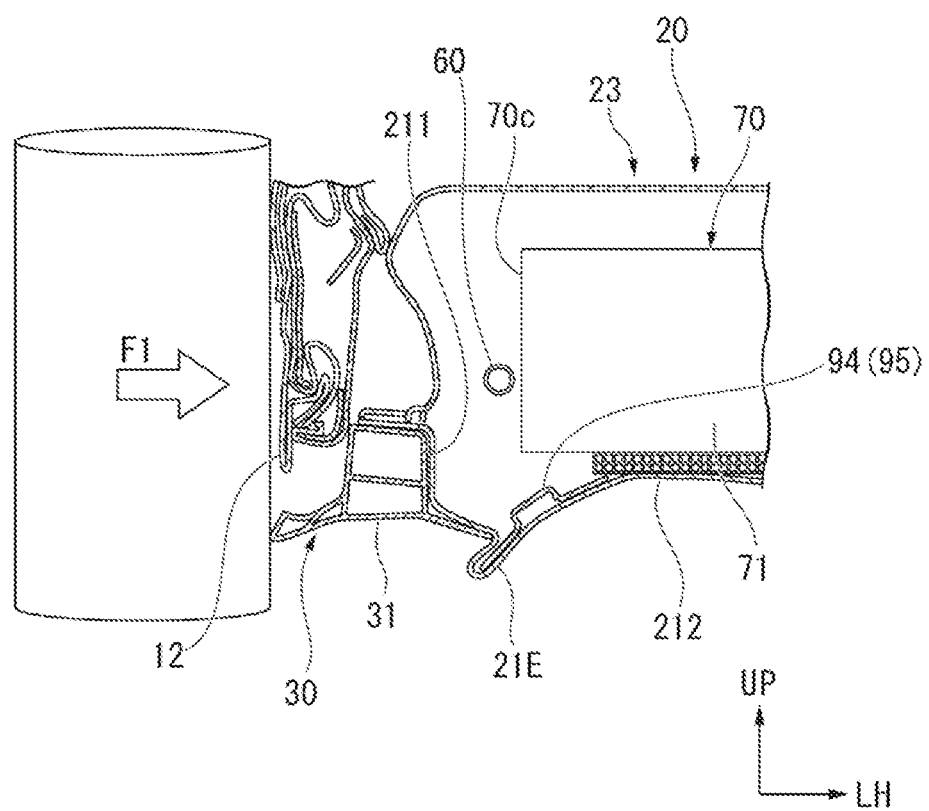
FIG. 14 is a cross-sectional view illustrating an example in which the tray deformation region of the battery pack of an embodiment is deformed.

As shown in FIGS. 12 to 14, the bottom wall 212 of the tray 21 may have a tray deformation region 21E that deforms and absorbs impact energy between the battery module 71 (the drive battery 70) and the side beam 31.

Specifically, the first piece of first vertical frame 94 on the right side and the first piece of second vertical frame 95 on the right side are extended toward the vehicle body front-rear direction at a right outer end portion 70c of the drive battery 70 in the vehicle width direction. The first piece of first vertical frame 94 on the right side and the first piece of second vertical frame 95 on the right side support the right outer end portion 70c of the drive battery 70 in the vehicle width direction.

On the bottom wall 212 of the tray 21, the tray deformation region 21E is arranged on the outer side in the vehicle width direction of the first piece of first vertical frame 94 on the right side (the vertical frame on the outer side) and the first piece of second vertical frame 95 on the right side (the vertical frame on the outer side).

The tray deformation region 21E is formed in a bead shape in a manner of projecting downward, and extends in the vehicle body front-rear direction. The tray deformation region 21E is formed to be significantly deformable in the vehicle width direction by the side collision load F1 of the side collision (see FIG. 14) compared with other regions on the bottom wall 212 of the tray 21.

Therefore, as shown in FIG. 14, the tray deformation region 21E can be deformed by the side collision load F1, and the side collision energy can be absorbed by the tray deformation region 21E. Thereby, for example, the need to reinforce the vehicle body frame (the skeleton member) such as the side sill 12 arranged on the outer side of the vehicle body in the vehicle width direction can be eliminated, and the weight of the vehicle body frame can be reduced.

According to this configuration, in the bottom wall 212 of the tray 21, the tray deformation region 21E that deforms and absorbs the impact energy is arranged between the battery module 71 and the side beam 31. Therefore, the impact can be made difficult to be transmitted to the battery module 71 at the time of side collision. Thereby, for example, the influence of the side collision on the battery module 71 can be reduced. In addition, for example, the weight of the vehicle body can be reduced using the tray deformation region 21E as a low-resistance structure.

Note that, the technical scope of the disclosure is not limited to the above-described embodiment, and various modifications can be added without departing from the gist of the disclosure.

In addition, the constituent elements in the above-described embodiment can be replaced with well-known constituent elements as appropriate without departing from the gist of the disclosure, and the above-described variation examples may be appropriately combined.

According to this configuration, the battery terminal, the high-voltage junction box, the control device, and the switch, which are the connection portions of the electric cable, are arranged above the seal member. Therefore, even if water enters from the seal member due to collision with an obstacle or the like, because the inside of the cover member 23 is airtight, water does not enter the inside of the cover in the same manner as an air pocket in a bath tub where the mouth is penetrated downward under the bath water surface, and the battery terminal, the high-voltage junction box, the control device, and the switch, which are connection portions of the electric cable, are made resistant to water splash. Thereby, for example, the need for a special measure against water splash such as the use of a splash shield or the like can be eliminated.

The tray may be made of metal, the cover member may be made of resin, and a depth of the tray (for example, a depth D21 of the embodiment) may be shallower than a depth of the cover member (for example, a depth D23 of the embodiment).

According to this configuration, the tray is made of metal. Therefore, the rigidity of the battery pack can be secured, and the mounted drive battery and the like can be protected. In addition, the cover member is made of resin. Therefore, the mass density can be reduced compared with a cover member made of metal. In addition, the depth of the tray is made shallower than the depth of the cover member. Therefore, the volume of the air pocket when water enters from the seal member becomes large, and the cover member which is larger in volume than the tray has a low mass density. Thereby, for example, the connection portions of the electric cable can be made more resistant to water splash. In addition, for example, the weight of the battery pack can be reduced.

The high-voltage junction box, the control device, and the switch may be arranged on the inner side of a floor tunnel (for example, a floor tunnel 13T of the embodiment).

According to this configuration, the high-voltage junction box, the control device, and the switch are arranged on the inner side of the floor tunnel. Therefore, these connection portions of the electric cable can be prevented from being arranged in the front-rear direction of the battery module. In addition, a space on the inner side of the floor tunnel can be effectively used. Thereby, for example, the connection portion of the electric cable can be made more resistant to water splash. In addition, for example, the battery pack can be made smaller and lighter.

The tray may have a cross member (for example, a cross member 90 of the embodiment), and the high-voltage junction box and the control device may be separated in a front-rear direction with the cross member as a boundary.

According to this configuration, the high-voltage junction box and the control device are separated in the front-rear direction with the cross member as a boundary. Therefore, a load further transmitted from the cross member to which a load caused by side collision is transmitted, and acting on the high-voltage junction box and the control device can be suppressed. Thereby, for example, the influence of the side collision on the high-voltage junction box and the control device can be reduced.

The high-voltage junction box, the control device, and the switch may be fixed to an upper surface of a deck (for example, a deck 100 of the embodiment) fixed to the cross member.

According to this configuration, the high-voltage junction box, the control device, and the switch are fixed to the upper surface of the deck which is fixed to the cross member. Therefore, even if the tray becomes shallow, the tray can be reinforced by the deck and the cross member. Thereby, for example, the bending rigidity of the tray or the battery pack can be increased. In addition, for example, the tray or the battery pack can be made difficult to vibrate.

The drive battery may include a battery module (for example, a battery module 71 of the embodiment) arranged vertically with a longitudinal direction facing a vehicle body front-rear direction. Plural sets of battery modules, which are paired and arranged with the cross member as a boundary in a manner that the battery terminals face each other, may be arranged along the longitudinal direction of the cross member. A high-voltage electric wire (for example, a high-voltage electric wire 40 of the embodiment) connected to the battery terminal may be wired along the longitudinal direction of the cross member, bundled above the deck, and wired along the front-rear direction toward the high-voltage junction box.

According to this configuration, the drive battery includes the battery module vertically arranged with the longitudinal direction facing the vehicle body front-rear direction. Therefore, the width dimension of the drive battery in the vehicle width direction can be suppressed to be small. Thereby, for example, when an input load caused by side collision (hereinafter, referred to as a side collision load F1) acts, an allowable deformation space (also referred to as a space for collision stroke) due to the side collision load F1 can be set large. In addition, the plural sets of battery modules, which are paired and arranged with the cross member as a boundary in a manner that the battery terminals face each other, are arranged along the longitudinal direction of the cross member, and the high-voltage electric wire connected to the battery terminal is wired along the longitudinal direction of the cross member, bundled above the deck, and wired along the front-rear direction toward the high-voltage junction box. Thereby, for example, in the side collision, the horizontal wiring of the high-voltage electric wire can be protected by the cross member, and the vertical wiring can be less susceptible to the side collision by being arranged in the tunnel portion and kept away from the input side. Furthermore, for example, the length of the high-voltage electric wire can be shortened by wiring the horizontal wiring and the vertical wiring in a T-shape or a +shape.

A water-cooled pipe (for example, a water-cooled pipe 60 of the embodiment) may be arranged along a wall surface of the tray facing an outer surface of the battery module.

According to this configuration, the water-cooled pipe is arranged along the wall surface of the tray facing the outer surface of the battery module. Therefore, the water-cooled pipe can be separated from the high-voltage electric wire, and the high-voltage electric wire can be suppressed from water splash when the water-cooled pipe is damaged. Thereby, for example, a water splash prevention cover can be eliminated.

The battery module may be sandwiched and fixed between the tray and the cross member or the deck.

According to this configuration, the battery module is sandwiched and fixed between the tray and the cross member or the deck. Therefore, the battery module can be reliably fixed even if the tray is shallow. Thereby, for example, it is available not to arrange a frame in the tray.

The tray may include a frame (for example, a frame 30 of the embodiment) having a side beam (for example, a side beam 31 of the embodiment) fixed to a lower surface of a side sill (for example, a side sill 12 of the embodiment), a front beam (for example, a front beam 33 of the embodiment) fixed to a front floor panel (for example, a front floor panel 134 of the embodiment) via a stay (for example, a stay 32 of the embodiment), and a rear beam (for example, a rear beam 35 of the embodiment) fixed to a rear floor panel via a bracket (for example, a bracket 34 of the embodiment).

According to this configuration, the tray includes the flame having the side beam fixed to the lower surface of the side sill, the front beam fixed to the front floor panel via the stay, and the rear beam fixed to the rear floor panel via the bracket. Therefore, the tray can be fixed to the side sill, the front floor panel, and the rear floor panel. Thereby, for example, a battery pack having a sufficient battery capacity can be mounted under the floor even if the ground clearance of the vehicle body is secured, and a foot space of the occupant in the front seat can also be secured.

(10) A bottom wall of the tray may have a tray deformation region (for example, a tray deformation region 21E of the embodiment) that deforms and absorbs impact energy between the battery module and the side beam.

According to this configuration, the tray deformation region that deforms and absorbs the impact energy is arranged between the battery module and the side beam on the bottom wall of the tray. Therefore, the impact can be made difficult to be transmitted to the battery module at the time of side collision. Thereby, for example, the influence of the side collision on the battery module can be reduced. In addition, for example, the weight of the vehicle body can be reduced by using the tray deformation region as a low-resistance structure.

According to the disclosure, it is possible to provide a vehicle body lower structure that can suppress water splash without covering connection portions of an electric cable with a special cover.

What is claimed is:

1. A vehicle body lower structure, comprising a battery pack that encloses a drive battery, wherein
    the battery pack comprises a tray and a cover member attached to an upper surface of the tray with a seal member interposed, the seal member making the inside of the battery pack liquid-tight; and
    a battery terminal, a high-voltage junction box, a control device, and a switch, which are connection portions of an electric cable, are arranged above the seal member,
    wherein the high-voltage junction box, the control device, and the switch are arranged on the inner side of a floor tunnel.

2. The vehicle body lower structure according to claim 1, wherein the tray is made of metal,
    the cover member is made of resin, and
    a depth of the tray is shallower than a depth of the cover member.

3. The vehicle body lower structure according to claim 1, wherein the high-voltage junction box, the control device, and the switch are fixed to an upper surface of a deck fixed to the cross member.

4. The vehicle body lower structure according to claim 3, wherein the drive battery comprises a battery module arranged vertically with a longitudinal direction facing a vehicle body front-rear direction;
    plural sets of battery modules, which are paired and arranged with the cross member as a boundary in a manner that the battery terminals face each other, are arranged along the longitudinal direction of the cross member; and
    a high-voltage electric wire connected to the battery terminal is wired along the longitudinal direction of the cross member, bundled above the deck, and wired along the front-rear direction toward the high-voltage junction box.

5. The vehicle body lower structure according to claim 4, wherein a water-cooled pipe is arranged along a wall surface of the tray facing an outer surface of the battery module.

6. The vehicle body lower structure according to claim 5, wherein the battery module is sandwiched and fixed between the tray and the cross member or the deck.

7. The vehicle body lower structure according to claim 5, wherein the tray comprises a frame having: a side beam fixed to a lower surface of a side sill, a front beam fixed to a front floor panel via a stay, and a rear beam fixed to a rear floor panel via a bracket.

8. The vehicle body lower structure according to claim 4, wherein the battery module is sandwiched and fixed between the tray and the cross member or the deck.

9. The vehicle body lower structure according to claim 8, wherein the tray comprises a frame having: a side beam fixed to a lower surface of a side sill, a front beam fixed to a front floor panel via a stay, and a rear beam fixed to a rear floor panel via a bracket.

10. The vehicle body lower structure according to claim 4, wherein the tray comprises a frame having: a side beam fixed to a lower surface of a side sill, a front beam fixed to a front floor panel via a stay, and a rear beam fixed to a rear floor panel via a bracket.

11. The vehicle body lower structure according to claim 10, wherein a bottom wall of the tray comprises a tray deformation region that deforms and absorbs impact energy between the battery module and the side beam.

12. A vehicle body lower structure, comprising a battery pack that encloses a drive battery, wherein
the battery pack comprises a tray and a cover member attached to an upper surface of the tray with a seal member interposed, the seal member making the inside of the battery pack liquid-tight; and
a battery terminal, a high-voltage junction box, a control device, and a switch, which are connection portions of an electric cable, are arranged above the seal member, wherein the tray has a cross member, and
the high-voltage junction box and the control device are separated in a front-rear direction with the cross member as a boundary.

13. The vehicle body lower structure according to claim 12, wherein the high-voltage junction box, the control device, and the switch are fixed to an upper surface of a deck fixed to the cross member.

14. The vehicle body lower structure according to claim 13, wherein the drive battery comprises a battery module arranged vertically with a longitudinal direction facing a vehicle body front-rear direction;
plural sets of battery modules, which are paired and arranged with the cross member as a boundary in a manner that the battery terminals face each other, are arranged along the longitudinal direction of the cross member; and
a high-voltage electric wire connected to the battery terminal is wired along the longitudinal direction of the cross member, bundled above the deck, and wired along the front-rear direction toward the high-voltage junction box.

15. The vehicle body lower structure according to claim 14, wherein a water-cooled pipe is arranged along a wall surface of the tray facing an outer surface of the battery module.

16. The vehicle body lower structure according to claim 15, wherein the battery module is sandwiched and fixed between the tray and the cross member or the deck.

17. The vehicle body lower structure according to claim 15, wherein the tray comprises a frame having: a side beam fixed to a lower surface of a side sill, a front beam fixed to a front floor panel via a stay, and a rear beam fixed to a rear floor panel via a bracket.

18. The vehicle body lower structure according to claim 14, wherein the battery module is sandwiched and fixed between the tray and the cross member or the deck.

19. The vehicle body lower structure according to claim 18, wherein the tray comprises a frame having: a side beam fixed to a lower surface of a side sill, a front beam fixed to a front floor panel via a stay, and a rear beam fixed to a rear floor panel via a bracket.

20. The vehicle body lower structure according to claim 14, wherein the tray comprises a frame having: a side beam fixed to a lower surface of a side sill, a front beam fixed to a front floor panel via a stay, and a rear beam fixed to a rear floor panel via a bracket.

21. The vehicle body lower structure according to claim 20, wherein a bottom wall of the tray comprises a tray deformation region that deforms and absorbs impact energy between the battery module and the side beam.

* * * * *